United States Patent [19]

Karol et al.

[11] Patent Number: 4,927,562
[45] Date of Patent: May 22, 1990

[54] ELASTOMER-COMPATIBLE OXALIC ACID ACYLATED ALKENYLSUCCINIMIDES

[75] Inventors: Thomas J. Karol; Theodore E. Nalesnik, both of Wappingers Falls, N.Y.

[73] Assignee: Texaco Inc., White Plains, N.Y.

[21] Appl. No.: 246,043

[22] Filed: Oct. 24, 1988

Related U.S. Application Data

[63] Continuation of Ser. No. 495,295, May 16, 1983, abandoned.

[51] Int. Cl.$^5$ ................. C10M 133/44; C07D 207/40
[52] U.S. Cl. ............................. 252/51.5 A; 548/546; 548/547
[58] Field of Search ................. 252/51.5 A; 548/546, 548/547

[56] References Cited

U.S. PATENT DOCUMENTS

| | | | |
|---|---|---|---|
| 3,415,750 | 12/1968 | Anzenberger | 252/51.5 A |
| 3,873,460 | 3/1975 | Coon et al. | 252/51.5 A |
| 4,460,381 | 7/1984 | Karol et al. | 44/63 |
| 4,501,597 | 2/1985 | Karol et al. | 44/63 |

FOREIGN PATENT DOCUMENTS 1162436  8/1969  United Kingdom .......... 252/51.5 A

Primary Examiner—William R. Dixon, Jr.
Assistant Examiner—E. McAvoy
Attorney, Agent, or Firm—Robert A. Kulason; James K. Poole

[57] ABSTRACT

Disclosed are elastomer-compatible mono- and bis-alkenylsuccinimide oxamides dispersants prepared by reacting a polyalkyleneamine succinimide with an amount of oxalic acid sufficient to react with at least 30 percent of the reactive nitrogens on the succinimide chain.

14 Claims, No Drawings

ELASTOMER-COMPATIBLE OXALIC ACID ACYLATED ALKENYLSUCCINIMIDES

This is a continuation of application Ser. No. 495,295, filed May 16, 1983, now abandoned.

BACKGROUND OF THE INVENTION

Field of the Invention

This invention relates to novel and potent dispersants for use in lubricating oils and which do not degrade the elastomer seals of internal combustion engines.

With the introduction of four cylinder internal combustion engines which must operate at high speeds to produce the required torque output, it has become increasingly difficult to provide a satisfactory dispersant lubricating oil composition.

An attendant problem facing the lubricant manufacturer is that of seal deterioration in the engine. All internal combustion engines use elastomer seals particularly the so-called "Viton" seals in their assembly. These seals are very susceptible to deterioration by the lubricating oil. A lubricating oil composition that seriously degrades the elastomer seals in an engine as evidenced in an elastomer bend test is unacceptable to an engine manufacturer and has limited marketability.

Patent Information Disclosure

There are numerous patents on the preparation and use of various alkenylsuccinimides as dispersants in lubricants. This description is restricted to those which are believed most relevant Very basic is U.S. Pat. No. 3,287,271 which discloses N-polyamine substituted succinimides obtained by combining a polyamine with a high molecular weight succinic anhydride and then contacting the resulting product with a dicarboxylic acid, having the carboxyl groups separated by at least three annular carbon atoms (3 to 4 annular carbon atoms). The product is obtained by combining at an elevated temperature an alkenyl succinic anhydride, wherein the alkenyl group has from about 30 to 200 carbon atoms, with a polyamine free of unsaturation (both aliphatic and aromatic) and having from 2 to 20 carbon atoms and from 2 to 10 nitrogen atoms; then combining at elevated temperatures the above product with an aromatic dicarboxylic acid having carboxyl groups bonded to annular carbons separated by at least one annular carbon atom such that the carboxylic groups are separated by at least three annular carbon atoms and having a total of from 2 to 16 carbon atoms.

U.S. Pat. No. 3,172,892 and 4,048,080 disclose alkenylsuccinimides formed from the reaction of an alkenylsuccinic anhydride and an alkylene polyamine and their use as dispersants in a lubricating oil composition.

U.S. Pat. No. 3,131,150 discloses lubricating oil compositions containing dispersant-detergent mono- and di-alkyl-succinimides or bis(alkenylsuccinimides).

Copending application Ser. No. 465,941 (Attorney Docket No. 77,578) filed on Feb. 14, 1983, discloses hydrocarbyl-substituted mono- and bis-succinimide dispersants having chain-linked or pendant monoacyl radicals and a lubricating oil composition containing same.

U.S. Pat. Nos. 3,401,118 and 4,338,205 also relate to alkenylsuccinimides of interest.

The disclosures of U.S. Pat. No. 3,172,892, U.S. Pat. No. 4,048,080 and of application Ser. No. 465,941 are incorporated herein by reference.

As will be seen hereinafter none of these disclose, hint or suggest in any manner whatsoever the novel and unobvious products of this invention.

SUMMARY OF THE INVENTION

The invention provides novel hydrocarbyl-substituted mono- and bis-succinimide oxamides represented by the formulas:

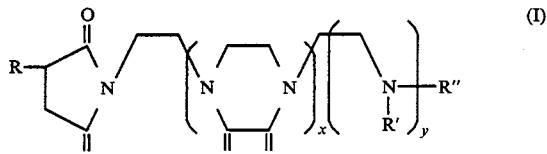

and

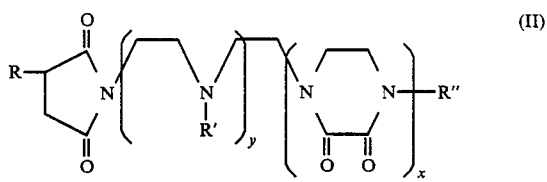

in which R is a hydrocarbyl radical having from 8 to 400 carbon atoms, x and y are numbers range from 0 to 6 whose additive total is from 1 to 6, R' is a hydrogen radical or a mono-, or bi-acyl radical of oxalic acid, and R" is a hydrogen or hydrocarbyl substituted succinic-N-ethylene radical of the formula

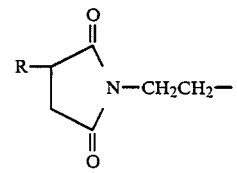

This invention also provides lubricant compositions which comprise a mineral oil base and an effective dispersant amount of the oxamides of the above formulas.

DISCLOSURE OF BEST MODE

Pursuant to the invention, the oxamides of the above formula are obtained by reacting at a temperature of about 110° to about 130° C. an alkenyl succinic anhydride, wherein the alkenyl group has from about 8 to 400 carbon atoms, with a polyamine having from 3 to 20 carbon atoms and from 2 to 10 nitrogen atoms; wherein the mole ratio of the polyamine to anhydride is from about 0.3:1 to 1.3:1 then reacting at a temperature of about 150° to about 170° C. the resulting succinimide with oxalic acid.

Only ethylene amines and oxalic acid readily form cyclic systems. The preferred ring size is the 6-membered ring (2,3-diketopiperazine). Surprisingly, treatment of ethyleneamino succinimides with other diacids form products which have high total acid numbers causing them to fail the Sequence III D Test.

As disclosed in U.S. Pat. No. 4,045,080, the alkenyl succinic anhydride reactant has the following formula:

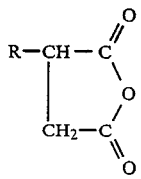

wherein R is an alkenyl radical having from 8 to 400 carbon atoms, preferably from about 50 to about 200 carbon atoms. Most preferably R is polyisobutenyl having a molecular weight of 1300.

The alkenyl radical is readily obtained by polymerizing olefins of from 2 to 5 carbons, such as propylene, ethylene, isobutylene, pentene, etc., and mixtures thereof. Methods of polymerization are well known in the art, e.g., U.S. Pat. Nos. 3,024,237; 3,024,195 and 3,018,291.

The amine with which the alkenyl succinic anhydride is reacted is a polyamine having 2 primary amino groups, is of from 3 to 20 carbon atoms, has from 1 to 10 nitrogen atoms, preferably 2 to 6 nitrogen atoms. The nitrogen atoms will be jointed by alkylene groups of from 2 to 6 carbon atoms, more usually of from 2 to 3 carbon atoms and, except the primary amino groups, will be substituted with hydrogen.

The organic polyamines come within the scope of the following formula:

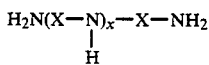

wherein X is an alkylene group or divalent radical of from 2 to 3 carbons, and x is an integer of from 0 to 5; preferably 2 to 4.

Illustrative of various alkylene amines and polyalkylene amines of the following formula are diethylenetriamine, triethylenetetramine, dipropylenetriamine, tetraethylenepentamine, pentaethylenehexamine, nonaethylenedecamine, and mixtures thereof.

In the preparation in situ of the alkenyl monosuccinimide precursors the molar proportion of amine to alkenylsuccinic acid or anhydride can be less or greater than 1 and ranges from 1.2 to 0.75 moles of amine per mole of anhydride.

To form the bis-succinimides the relative amounts can be less or greater than 0.5 and ranges from 0.3 to 0.75. The range of 0.3:1 to 1.3:1 covers both mono-and bis-succinimides and any operative mixtures thereof.

It is essential that at least 30 percent of the reactive nitrogen atoms in the succinimide chain of the precursor form an oxamine with oxalic acid in order to provide a dispersant that does not promote the deterioration of elastomer of Viton engine seals. It is preferred that at least fifty percent, i.e. from 50 to 100 percent, of the reactive nitrogen atoms be reacted to form the amide. The most preferred compounds are those in which substantially all of the reactive nitrogens in the succinimide chain have been reacted such as from about 85 to 95 percent, to form oxamides.

Particularly effective acylated hydrocarbyl-substituted monosuccinimides are those prepared from an alkenylsuccinimide wherein the alkenyl radical is polyisobutenyl and has a mol. wt. of 1300.

The hydrocarbyl-substituted monosuccinimide oxamides of the invention are prepared by reacting in an inert medium a hydrocarbylsuccinimide or hydrocarbyl-substituted bis-succinimide with oxalic acid and effecting a reaction under acylating conditions. The amount of oxalic acid employed is an amount necessary to react with at least 30 percent of the reactive nitrogen atoms in the succinimide chain. Preferably, the amount of oxalic acid employed can react with at least seventy percent of the reactive nitrogen atoms in the succinimide chain to effect the formation of amides. An amount of oxalic acid approximately stoichiometric to the amount of reactive nitrogen atoms present in the succinimide chain or an excess thereof can be employed. To form the oxamides of the bis-succinimides approximately an equivalent amount of oxalic acid is also used (i.e. 0.5 moles oxalic acid per reactive nitrogen). The oxalic acid and the reactive nitrogen moieties in the succinimide are reacted until the desired acylation or percentage of amidation has taken place. There is no need to isolate the precursor from an initial succinimide reaction mass and the oxalic acid is added sequentially to the reaction mixture.

The inert medium may be any liquid or solvent that permits sufficient contact between the reactants to provide a reasonable rate of reaction and which is a liquid under the reaction conditions. Conveniently, an oil of lubricating viscosity can be used, e.g., petroleum oils, such as paraffinic, aromatic and naphthenic oils. When an oil of lubricating viscosity is used as the medium, the composition may be prepared as a concentrate which may be diluted with other oils to form the final lubricating oil composition.

The concentration of the reactants in the inert medium may range from 1 to 90 weight percent, but will more usually be from about 25 to 75 weight percent of the total reaction mixture.

The time for the reaction will generally be from about one hour to 24 hours or more, more usually in the range of about 1 to 2 hours.

During the reaction with oxalic acid, the water that is formed is removed. The removal of the water may be carried out by any means known in the art.

The succinimide oxamides of the invention are employed in a mineral oil or in a lubricating oil composition at a concentration ranging from about 0.01 to 10 weight percent.

The lubricating oils which are combined with the dispersant compounds can be derived from natural or synthetic sources. These oils generally have viscosities of from about 35 to 50,000 Saybolt Universal Seconds (SUS) at 100° F. Among natural hydrocarbon oils are paraffin base, naphthenic base, asphaltic base and mixed base oils. Illustrative of the synthetic oils are: hydrocarbon oils, such as polymers of various olefins; and alkylated aromatic hydrocarbons; and nonhydrocarbon oils, such as polyalkylene oxides, aromatic ethers, carboxylate esters, phosphate esters and silicon esters. The preferred media are the hydrocarbon media, both natural and synthetic.

Usually included in the oils are other additives, such as extreme pressure agents, rust inhibitors, antioxidants, oiliness agents, foam inhibitors, viscosity index improvers, pour point depressants and occasionally other dispersants. Usually, these will be present in the range from about 0.01 to 10 weight percent, more usually from about 0.5 to 5 weight percent of the composition; generally, each of the additives will be present in the range from about 0.01 to 5 weight percent of the composition.

However, the oil compositions may be prepared as concentrates and diluted prior to use. As concentrates, the amount of the active compound may range from about 10 to 80 weight percent.

The following examples illustrate the preparation of 5 specific hydrocarbyl-substituted mono- and bis-succinimides having at least one oxamido ring between alternate pairs of nitrogens in their side chains and their utility and effectiveness in preventing the deterioration of elastomer engine seals.

EXAMPLE I

Preparation of Oxamide Polyisobutenylsuccinimide

A paraffinic mineral oil solution was prepared by combining 12.7 grams (0.067 moles) of tetraethylenepentamine (TEPA) with 119.4 grams of a pale stock Hy-finish mineral oil which had a specific gravity of 0.88, a gravity API of 29 and a viscosity SUS at 100° F. of 100. The mixture was blanketed with nitrogen and heated to 60° C. 200 grams of a polyisobutenyl (1300 mw) succinic anhydride (sap. No. =42, diluent oil =23%) was added and heated to 110° to 120° C. for one hour. Then 15.0 g of oxalic acid dihydrate (.118 moles) were added and the mixture was heated to 160° C. for 2 hours. The product was filtered while hot.

The procedure of Example I was repeated with the following charge: 4000 grams ASAA, 254.7 grams (1.34 moles) of amine, 2388 grams of mineral, and 300 g of oxalic acid dihydrate.

EXAMPLE II

Preparation Of TEPA Bis-succinimide Oxamide 3238 grams (1.5 moles) of alkenyl succinic anhydride (H300) were charged to a reaction flask with 3005.4 grams of mineral oil. The reaction flask was blanketed with nitrogen and heated to 60° C. Then 156 grams (0.824 moles) of TEPA was charged and the mixture was heated to 110° and 120° C. for one hour. Oxalic acid dihydrate (130 grams, 1.03 moles) and 1 ml of a silicon antifoam agent were added to the reaction mass which was heated to 160° for 2 hours while removing the water of reaction as it formed. The mixture was filtered while hot.

EXAMPLE III

PEHA Bis-Imide Oxamine

The procedure of Example II was followed using:

|  | grams | moles |
|---|---|---|
| ASAA (Sap. No. 51.9, Diluent Oil = 6%) | 4000 | 1.85 |
| Ethyleneamine E-100 (DOW "PEHA") | 265 | 1.02 |
| 100 E Pale Oil Hy Finish | 3785 | — |
| Oxalic Acid Dihydrate | 193 | 1.53 |
| Antifoam Agent | 1 ml | |

The products of the above Examples were analyzed for % nitrogen and their total base number (TBN) was determined by their turbidity and ASTM color on the basis of 8% concentration in an SAE 10W-40 fully formulated motor oil. The results are as follows:

TABLE I

|  | EXAMPLE I | | EXAMPLE II | | EXAMPLE III |
|---|---|---|---|---|---|
|  | Ex. Ia | Ex. Ib | Ex. IIa | Ex. IIb |  |
| % N | 1.33 | 1.25 | 0.78 | 0.79 | 1.03 |
| TBN (ASTM D-664) | 6.24 | 9.27 | 4.91 | 4.46 | 9.0 |
| TAN (ASTM D-974) | 0.10 | 0.31 | 2.61 | 4.0 | 2.20 |
| LUM. TURB. @ 8% | .5 | 3.5 | 2.0 | 2.5 | — |
| Color (ASTM D-1500)[1] | <3.0 | <3.0 | <2.5 | <2.5 | — |

[1] The following tests were carried out in a blend containing the oxamide succinimide in an SAE 10W-40 formulation.

The mono- and bis-succinimide oxamides of Examples I and II were tested in the Bench VC Test. This test is conducted by heating the test oil mixed with a synthetic hydrocarbon blowby and a diluent oil at a fixed temperature for a fixed time period. After heating, the turbidity of the resulting mixture is measured. A low percentage turbidity (0 to 10) is indicative of good dispersancy while a high value (20 to 100) is indicative of an oil's increasingly poor dispersancy. The results obtained with the oxamides of Examples I and II are set forth in Table II below at 6 and 4 percent by weight concentration respectively, in an SAE 10W-40 fully formulated motor oil:

TABLE II

|  |  | REFERENCE OILS | | |
|---|---|---|---|---|
| EXAMPLE | AVERAGE RESULTS | POOR (PV-911) | INTERMEDIATE (FREO 200-3) | GOOD (PV-914) |
| I | 13.9 (2 runs) | 51.3 | 21.1 | 7.4 |
| II | 21.2 (4 runs) | 71.8 | 35.5 | 9.0 |

Further exemplary useful compounds of the above formulas are presented in tabular form below:

| Example | R | X | Y | R' | R'' |
|---|---|---|---|---|---|
| | | FORMULA I | | | |
| 1 | 8 carbon atoms | 2 | 1 | H | H |
| 2 | 40 carbon atoms | 2 | 0 | H | H |
| 3 | 200 carbon atoms | 1 | 1 | monoxalyl | alkenyl succinyl-N-ethylenyl |
| 4 | 400 carbon atoms | 2 | 1 | bioxalyl | alkenyl succinyl-N-ethylenyl |
| | | FORMULA II | | | |
| 5 | 16 carbon atoms | 2 | 2 | H | H |
| 6 | 32 carbon atoms | 2 | 0 | H | H |
| 7 | 200 carbon atoms | 1 | 1 | monoxalyl | alkenyl succinyl-N-ethylenyl |
| 8 | 400 carbon atoms | 2 | 1 | bioxalyl | alkenyl succinyl-N-ethylenyl |

An important property of a lubricating oil additive and a blended lubricating oil composition containing such additives is the compatibility of the oil composition with the rubber seals employed in the engine. Nitrogen-containing succinimide dispersants employed in crankcase lubricating oil compositions can degrade the rubber seals in internal combustion engines. In particular, such dispersants can attack Viton AK-6 rubber seals which are commonly employed in internal combustion engines. This deterioration exhibits itself by sharply degrading the flexibility of the seals and in increasing their hardness. This is such a critical problem that the Daimler Benz Corporation requires that all crankcase lubricating oils must pass a Viton Seal Compatibility Test before the oil composition will be rated acceptable for engine crankcase service.

The Viton compatibility of oxamide polyaminesuccinimides was determined using fully formulated blends, in the Daimler Benz Viton seal compatibility test.

The results are tabulated in Table III:

TABLE III

|  | A | B | C | D | E | F |
|---|---|---|---|---|---|---|
| Example I @ 0.04 N | NC | −43 | 153 | 8.7 | +2 | 0.45 |
| Daimler Benz Limits | NC | — | 130 max | 7.5 max | — | +5 to −2 | a. Cracking (C) or no cracking (NC)
b. Change in % elongation
c. Percent elongation
d. Tensile Strength (N/MM²)
e. Hardness change
f. Volume change The non-derivatized dispersant analog fails this test at the same snitrogen treatment level.

Further Daimler Benz Viton testing is presented on oil formulations which have been engine tested and follow further in the text.

The product of Example II also was tested by the Sequence V-D gasoline engine test in a fully formulated oil at 3.3 wt % (0.041N) and gave the following results:

| TEST NAME | RESULT |
|---|---|
| Viscosity Kin 400C CS | 69.3 |
| Viscosity Kin 100C CS | 11.01 |
| Color ASTM | 2.5 |
| Calcium, % X-Ray | .19 |
| Lumetron Turbidity | 7.0 |
| Nitrogen, % | 0.060 |
| Phosphorus, % X-Ray | .11 |
| Sulfur, % X-Ray Total | .53 |
| Zinc, % X-Ray | .12 |
| Rubber Compatibility Type: Daimler Benz Viton | |
| Temperature, F/Hour | 300/168 |
| Volume Change, % | +0.4 |
| Hardness Change, PTS | +2 |
| Bend Test | NC |
| Elongation Change, % | −43 |
| Elongation, % | 153 |
| Tensile Strength, N/MM2 | 8.9 |
| Bench VC test | 20.8 |
| Reference PV-914 (Good) | 14.4 |
| Reference FREO-200 (Intermediate) | 32.5 |
| Reference PV-911 (Poor) | 52.1 |
| Ford Sequence V-D | |
| Average Sludge | 9.63 |
| Piston Skirt Varnish | 5.74 |
| Average Varnish | 6.64 |

The Sequence V-D test evaluated the performance of engine oils in terms of the protection provided against sludge and varnish deposits as well as valve train wear in gasoline engines. The test is carried out with a Ford 2.3 liter 4 cylinder engine using cyclic low and mid range engine operating temperatures and a high rate of blowby.

The diesel engine performance of Example II, as measured by the Caterpillar 1-G2 testing in SAE 30 fully formulated oil formulation using 0.055 nitrogen from the dispersant gave the following result:

| TEST NAME | RESULTS |
|---|---|
| Viscosity Kin 40C CS | 70.9 |
| Viscosity Kin 100C CS | 11.17 |
| Color ASTM | <2.5 |
| Calcium, % X-Ray | .21 |
| Lumetron Turbidity, % | 7.5 |
| Nitrogen, % | 0.066 |
| Phosphorus, % X-Ray | .11 |
| Sulfur, % X-Ray Total | .54 |
| Zinc, % X-Ray | .12 |
| Rubber Compatibility Type: Diamler Benz Viton | |
| Temperature, F/Hour | 300/168 |
| Volume Change, % | +0.20 |
| Hardness Change, PTS | +2 |
| Bend Test | NC |
| Elongation Change, % | −48 |
| Elongation, % | 140 |
| Tensile Strength, N/MM2 | 7.3 |
| Bench VC Test | 26.7 |
| Reference PV-914 (Good) | 17.7 |
| Reference FREO-200 (Intermediate) | 38.0 |
| Reference PV-911 (Poor) | 69.8 |
| Caterpillar 1-H2 Test | |
| TGF, 120 Hours, % | 7 |
| TGF, 480 Hours, % | 17 |
| TWD, 120 Hours | 47.9 |
| TWD, 480 Hours | 132.6 |

The product of Example II was formulated in an SAE 30 motor oil blend, with the following results.

| TEST NAME | RESULTS |
|---|---|
| Viscosity Kin 40C CS | 104.2 |
| Viscosity Kin 100C CS | 11.49 |
| Pour Point, F | −15 |
| Color ASTM | 4.0 |
| Calcium, % X-Ray | .23 |
| Lumetron Turbidity, % | 6.0 |
| Nitrogen, % | 0.076 |
| Phosphorus, % X-Ray | .14 |
| Sulfur, % X-Ray Total | .71 |
| Zinc, % X-Ray | .15 |
| Caterpillar 1-G2 Test | |
| TGR, 120 Hours, % | 21 |
| TGF, 480 Hours, % | 40 |
| TWD, 120 Hours | 156.2 |
| TWD, 480 Hours | 286.9 |

The oxamide of Example I was blended at 05N in an SAE 30 motor oil formulation, which gave the following results:

| TEST NAME | RESULTS |
|---|---|
| Gravity Specific 60/60F | 0.8957 |
| Flash COC, F | 480 |
| Viscosity Kin 40C CS | 98.5 |
| Viscosity Kin 100C CS | 11.10 |
| Pour Point, F | −25 |
| Color ASTM | 4.0 |
| TAN D-664 | 2.3 |
| TBN D-664 | 4.09 |
| TBN D-2896 | 7.61 |
| Calcium, X-Ray | .24 |
| Lumetron Turbidity, % | 4.0 |
| Nitrogen, % | 0.090 |
| Phosphorus, % X-Ray | .13 |
| Sulfur, % X-Ray Total | .81 |
| Zinc, % X-Ray | .15 |
| ASTM Salt Water Rust | Pass |
| ASTM Distilled Water Rust | Pass |
| CRC Foam Test ST-180 Seq I | |
| Volume | 0 |
| Collapse, Seconds | 0 |

-continued

| TEST NAME | RESULTS |
| --- | --- |
| Volume, 10 Minutes | 0 |
| CRC Foam Test ST-180 Seq II | |
| Volume | 20 |
| Collapse, Seconds | 9 |
| Volume, 10 minutes | 0 |
| CRC Foam Test ST-180 Seq III | |
| Volume | 0 |
| Collapse, Seconds | 0 |
| Volume, 10 minutes | 0 |
| Rubber Compatibility | |
| Type: Daimler Benz | |
| Temperature, F/Hour | 300/168 |
| Volume Change, % | +0.40 |
| Hardness Change, PTS | +2 |
| Bend Test | NC |
| Elongation Change, % | −25 |
| Elongation, % | 200 |
| Tensile Strength, N/MM2 | 11.3 |
| Ghent Panel Coke, 24 Hr, Mg | 35.7 |
| Bench VC Test | 15.9 |
| Reference PV-914 (Good) | 12.2 |
| Reference FREO-200 (Intermediate) | 39.5 |
| Reference PV-911 (Poor) | 61.9 |
| CLR L-38 Test | |
| Bearing Weight Loss, Mg | 5.8 |
| Piston Skirt Varnish | 9.7 |

The product of Example III was formulated at 0.055N in an SAE 30 motor oil formulation which gave the following results:

| TEST NAME | RESULTS |
| --- | --- |
| Viscosity Kin 40C CS | 100.1 |
| Viscosity Kin 100C CS | 11.16 |
| Pour Point, F | −20 |
| Color ASTM | 4.0 |
| Calcium, % X-Ray | .24 |
| Lumetron Turbidity, % | 3.5 |
| Nitrogen, % | 0.065 |
| Phosphorus, % X-Ray | .14 |
| Sulfur, % X-Ray Total | .76 |
| Zinc, % X-Ray | .15 |
| ASTM Salt Water Rust | Pass |
| ASTM Distilled Water Rust | Pass |
| CRC Foam Test ST-180 Seq I | |
| Volume | 0 |
| Collapse, Seconds | 0 |
| Volume, 10 minutes | 0 |
| CRC Foam Test ST-180 Seq II | |
| Volume | 40 |
| Collapse, Seconds | 23 |
| Volume, 10 Minutes | 0 |
| CRC Foam Test ST-180 Seq III | |
| Volume | 0 |
| Collapse, Seconds | 0 |
| Volume, 10 Minutes | 0 |
| Ghent Panel Coke, 24 Hr, Mg | 59.0 |
| Bench VC Test | 8.4 |
| Reference PV-194 (Good) | 7.2 |
| Reference FREO-200 (Intermediate) | 26.8 |
| Reference PV-911 (Poor) | 58.8 |
| Caterpillar 1-G2 Test | |
| TGF, 120 Hours, % | 45 |
| TWD, 120 Hours | 240.4 |
| CLR L-38 Test | |
| Bearing Weight Loss, Mg | 15.9 |
| Piston Skirt Varnish | 9.7 |

What is claimed is:
1. A compound of the formula:

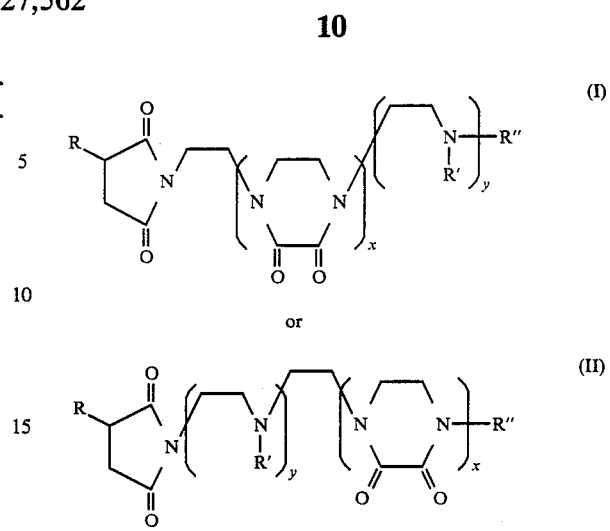

in which R is a hydrocarbyl radical having from 8 to 400 carbon atoms, "X is a number ranging from 1 to 6, Y is a number ranging from 0 to 6," whose additive total is from 1 to 6, R' is hydrogen or a mono-, or bi-acyl radical of oxalic acid, and R" is a hydrogen or hydrocarbyl substituted succinic-N-ethylene radical of the formula

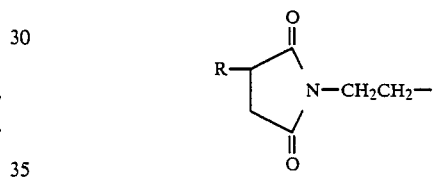

2. The compound of claim 1 wherein R is an alkenyl group having from about 50 to about 200 carbon atoms.

3. The compound of claim 2, wherein R is polyisobutenyl and has a molecular weight of about 1300.

4. The compound of claim 1, wherein R is an alkyl radical having about 50 to about 200 carbon atoms.

5. A lubricant composition comprising a major proportion of an oil of lubricating viscosity and a minor effective dispersant amount of the compound of claim 1, or of a mixture thereof.

6. A lubricant composition according to claim 5 containing from about 0.01 10 weight percent of said compound.

7. A lubricant composition according to claim 5, containing from about 0.5 to 5 weight percent of said compound.

8. A lubricating oil composition comprising an oil of lubricating viscosity, and an effective dispersant amount of a compound obtained by (1) reacting under imidizing conditions:
  at least one alkenyl succinic anhydride having from 8 to 40 carbon atoms in the alkenyl radical, with
  at least one alkylene polyamine having 2 primary amino groups, from 1 to 10 carbon atoms and from 2 to 10 nitrogen atoms;
  wherein the mole ratio of the polyamine to the anhydride is from about 0.3:1 to about 1.3:1; followed by
  (2) reacting at a temperature above 50° C
said succinimide with a mole ratio of oxalic acid sufficient to react with at least 30 percent of the reactive nitrogen moieties in said succinimide.

9. The oil of claim 8 wherein said mole ratio of said polyamine to said anhydride is from 1.2 to 0.75, whereby monosuccinimides are formed.

10. The oil of claim 8, wherein said mole ratio of said polyamine to said anhydride ranges from 0.3 to 0.75 whereby bis-succinimides are formed.

11. The oil of claim 8, wherein the mole ratio of said oxalic acid ranges from 50 to 100 percent of said reactive nitrogen moieties of said succinimide.

12. The oil of claim 8, wherein said alkylene polyamine comprises diethylenetriamine, triethylenetetramine, dipropylenetramine, tetraethylenepentaamine, pentaethylenehexamine, nonaethylenedecamine and mixtures thereof.

13. The oil of claim 8, wherein said reaction (2) is carried out at a temperature in the range of about 150° C. to about 170° C.

14. The oil of claim 8, containing a mixture of said oxamides.

* * * * *

UNITED STATES PATENT AND TRADEMARK OFFICE
CERTIFICATE OF CORRECTION

PATENT NO. : 4,927,562

DATED : May 22, 1990

INVENTOR(S) : Karol, et al

It is certified that error appears in the above-identified patent and that said Letters Patent is hereby corrected as shown below:

Col. 10, line 48, claim 6, insert --to--after "0.01".

Col. 10, line 58, claim 8, correct "40" to read --400--.

Signed and Sealed this

Tenth Day of September, 1991

Attest:

HARRY F. MANBECK, JR.

Attesting Officer

Commissioner of Patents and Trademarks